July 30, 1963 R. HOFBERG 3,099,483
AUTOMOBILE SEAT COVER
Filed May 16, 1962 2 Sheets-Sheet 1
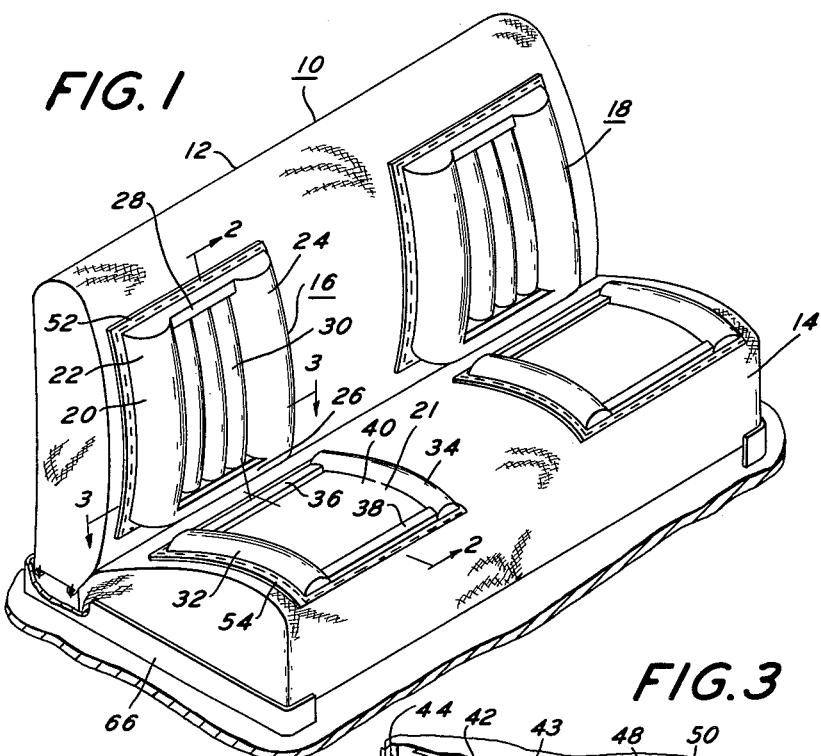
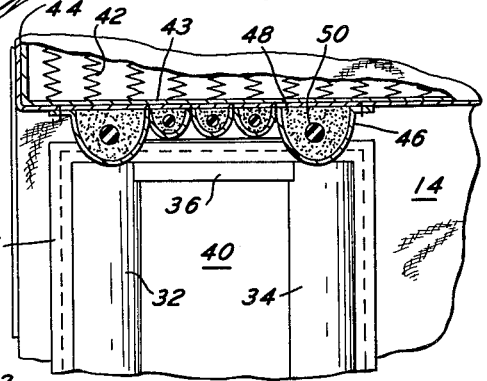
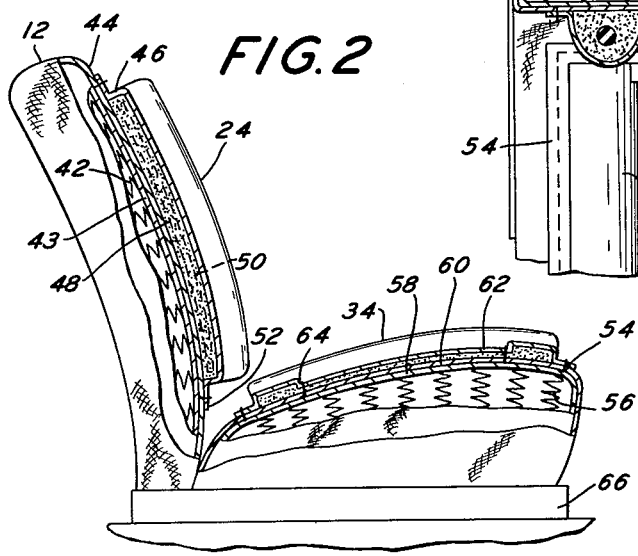
INVENTOR.
ROBERT HOFBERG
BY
*Arthur H. Seidel*
ATTORNEY July 30, 1963   R. HOFBERG   3,099,483
AUTOMOBILE SEAT COVER
Filed May 16, 1962   2 Sheets-Sheet 2
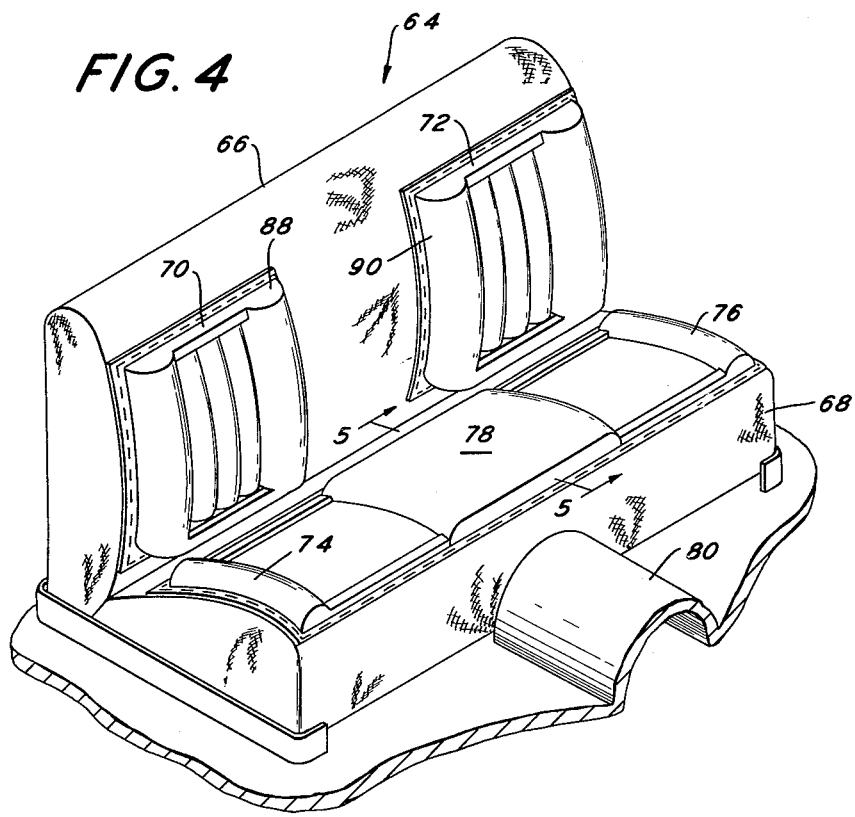
FIG. 4
FIG. 5
INVENTOR.
ROBERT HOFBERG
BY
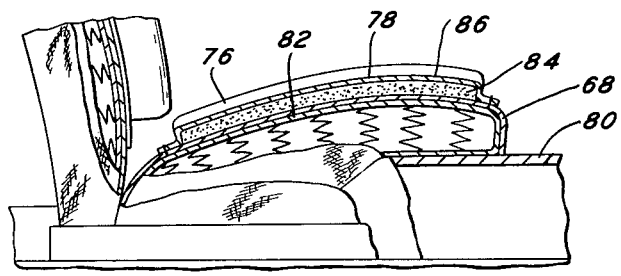
ATTORNEY

United States Patent Office 3,099,483
Patented July 30, 1963

3,099,483
AUTOMOBILE SEAT COVER
Robert Hofberg, 1802 Fox Chase Road,
Philadelphia 16, Pa.
Filed May 16, 1962, Ser. No. 195,206
3 Claims. (Cl. 297—219)

In general, this invention relates to an automobile seat cover, more particularly to an automobile seat cover which can be utilized to transform a bench-type automobile seat into two bucket seats.

At the present time, it is extremely expensive to convert an automobile having bench-type seats into one with bucket seats. The advantages of bucket seats are well-known, and include the additional comfort, safety and support for the user thereof. In the past, in order for one to so convert an automobile, it was necessary to remove the entire bench-type seat and install separate bucket-type seats.

Another problem of modern automobile bench-type seats is the thin padding in the center of a bench-type seat in an automobile having a high driveshaft. Since the modern car is low slung, the driveshaft necessarily leaves little room in the manufacture of the bench-type seat for adequate cushioning.

It is the general object of this invention to avoid and overcome the foregoing difficulty by the provision of a new, simple and inexpensive automobile seat cover for converting bench-type seats to bucket seats.

Another object is to provide a new automobile seat cover which is inexpensive, easy to install, and which will convert a bench-type seat to a bucket seat.

Another object is to provide a new and improved automobile seat cover which may be utilized as a bench-type seat or a bucket seat at the user's whim.

Another object is to provide a new and improved automobile seat cover which will convert a bench-type seat to two bucket seats and additionally provide adequate cushioning in the center of the seat over the automobile drive shaft.

Other objects will appear hereinafter.

For the purpose of illustrating the invention there is shown in the drawings forms which are presently preferred; it being understood, however, that this invention is not limited to the precise arrangements and instrumentalities shown.

FIGURE 1 is a perspective view of an automobile seat cover incorporating the features of the present invention.

FIGURE 2 is a side cross sectional view of the embodiment shown in FIGURE 1 taken along lines 2—2.

FIGURE 3 is a cross sectional view of the seat cover of FIGURE 1 taken along lines 3—3.

FIGURE 4 is a perspective view of a second embodiment of an automobile seat cover incorporating the features of the present invention.

FIGURE 5 is a cross sectional view of the embodiment shown in FIGURE 4 taken along lines 5—5.

The automobile seat cover of my invention is generally designated by the numeral 10 and is shown in position on an automobile bench-type seat for purposes of clarity.

The seat cover 10 consists of a back support portion 12 and a bottom seat portion 14. The seat cover 10 has two bucket-type seat additions 16 and 18 on the left and right sides of the seat respectively. It will be recognized that the seat cover of the present invention could be used on an automobile seat having a split back portion, or one in which only one side of the seat cover required the bucket seat addition.

For the purposes of clarity, only the bucket seat addition 16 will be described in detail, it being understood that the bucket seat addition 18 is similar in all respects thereto.

The bucket seat addition 16 consists of a back rest portion 20 and a bottom seat portion 21. The back rest portion 20 has two vertical side supports 22 and 24 along opposite edges thereof. The supports 22 and 24 are semi-cylindrical in shape and are adapted to conform to the sides of the user. The side supports 22 and 24 are joined by bottom connecting portion 26 and top connecting portion 28. The bottom connection portion 26 extends from the outermost surface of the supports 22 and 24.

In the space between the side supports 22 and 24 and the connecting portions 26 and 28 are vertical back rest supports 30. The back rest supports 30 are semi-cylindrical in shape and have a radius substantially half that of the side supports 22 and 24. In the embodiment shown in FIGURE 1, three such back rest supports are utilized, but it can easily be seen that as many back rest supports may be utilized as are necessary for the particular user. The top connection portion 28 extends out of the plane of the back seat cover 12 to a point on the outermost surface of the back rest supports 30. The connecting portion 28 also extends horizontally between the side supports 22 and 24.

Thus it can be seen that the back portion 20 of the bucket seat 16 is designed to conform to the general shape of the back of the user so as to give proper support and comfort to the user thereof.

The bottom part 21 of the bucket seat 16 has side support strips 32 and 34. The side support strips 32 and 34 are curvilinear and extend from the front of the seat to the back. The side strips 32 and 34 are spaced so as to conform to the width of the seat of the user. Connecting bars 36 and 38 are placed between the side strips 32 and 34 along the back and front of the bottom portion 21. In the center of the bottom portion 21 is a cushioning flat piece 40 whose bounding edges are the side strips 32 and 34 and the connecting bars 36 and 38.

Referring now to FIGURES 2 and 3, it can be seen that the automobile seat has springs 42 on the back cushion thereof and a fabric covering 43 surrounding the springs. The back seat cover 12 has a fabric portion 44 adapted to conform and fit over the back of the seat in any well-known manner. The back seat cover 12 can be attached to the automobile seat in any well-known manner such as by a zipper closure. The back bucket seat portion 20 consists of a fabric covering 46 within which is inserted a foam rubber insert 48 conforming to the outline discussed with respect to FIGURE 1. The foam rubber insert 48 has a polystyrene cone 50 in each semicylindrical longitudinal portion. This cone 50 is placed in each of the back rest supports 30 and the side supports 22 and 24. The cones 50 are bonded to the foam rubber to create softness coupled with rigidity.

The polystyrene cone 50 provides rigidity to the bucket seat and offers resistance to deformation after a predetermined deformation of the foam rubber 48. The fabric 46 is sewn to the seat cover fabric 44 along a line 52 extending around the back bucket seat portion 20. It will be understood that if it is desired to have the bucket seat addition removable from the seat cover 10, the seam 52 could be replaced by a separable fastening device such as a zipper.

In the embodiment shown, the back rest supports 30 are sewn into place against the seat cover fabric 44. The bottom bucket seat portion 21 is also similarly stitched along line 54 to the bottom seat cover 14.

The bottom cushion of the automobile has springs 56 around which is placed a fabric covering 58. The seat cover 14 of the present invention is adapted to be fitted around the fabric 58 of the bottom cushion. The seat cover 14 has a fabric portion 60 to which is secured the bottom bucket addition 21. The bottom bucket addition 21 has a fabric layer 62 fitted over a foam rubber insert 64. The foam rubber insert 64 is manufactured so as to conform to the general configurations discussed with respect to FIGURE 1.

It should be noted at this time that the back bucket seat portion 20 has an annular outer periphery with a recessed inner portion having semicylindrical longitudinal supports therein. The top of the annular periphery, namely the connecting bar 28, is recessed with respect to the rest of the annular outer periphery.

It should also be noted that the bottom bucket seat portion 21 has an annular raised peripheral portion consisting of side supports 32 and 34 and connecting bars 36 and 38. The connecting bars 36 and 38 are somewhat recessed with respect to the strips 32 and 34.

These general configurations are structurally interrelated so as to conform to the shape of the driver or passenger of the car. They act to support and at the same time provide comfort for the person using it.

It should be noted that by simply putting the seat cover 10 on a standard bench-type automobile seat, the seat has been transformed into two separate bucket seats. To give some additional flair to the impression created by the bucket seats, chrome strips 66 might be placed around the edges of the automobile seat.

If zippers are utilized to connect the bucket seat additions to the seat cover, it is possible for the user thereof to remove these additions and easily convert the seat cover to bench-type operation with little effort. The zippers would be of the fabric covered type so as not to catch or in any other way detract from the normal use of the automobile seat.

A second embodiment of the present invention is shown in FIGURES 4 and 5. The seat cover 64 shown in FIGURE 4 consists of a back portion 66 and a bottom portion 68. On the left and right sides of the back portion 66 are two back bucket seat portions 70 and 72 substantially similar to the back bucket seat portions of FIGURE 1. The back bucket seat portions 70 and 72 have bottom bucket seat portions 74 and 76 respectively associated therewith. The bottom bucket seat portions 74 and 76 are on opposite sides of the bottom seat cover 68 and are mirror images of each other. The center side ribs of the bottom bucket seat portions 74 and 76 are continued toward the center of the bottom seat cover 68 to form a curved raised center seat cushion 78.

The driveshaft of the automobile forms a hump 80 passing through the center of the bottom seat cushion 82. This hump limits the length of the springs in the bottom seat cushion 82 at the center thereof, and therefore the bench-type seat is less comfortable in the center for the user. The bottom seat cover 68 is fitted over the bottom seat cushion 82. The bottom seat cover 68 has a pocket in the center thereof to receive a foam rubber insert 84 which conforms to the dimensions of the cushion 78. A fabric covering 86 is provided over the foam rubber insert 84 to form the cushion 78.

In accordance with the embodiment shown in FIGURES 4 and 5, there has been provided an automobile seat cover capable of converting a bench-type seat into two bucket seats with a center raised cushion. The user of the center cushion 78 also takes advantage of the side support strips 88 and 90 of the back bucket seat portions 70 and 72 respectively. These help form a separate back support for the user of the center of the automobile seat.

The present invention may be embodied in other specific forms without departing from the spirit or essential attributes thereof and, accordingly, reference should be made to the appended claims, rather than to the foregoing specification as indicating the scope of the invention.

I claim:
1. An automobile seat cover for covering a bench-type seat having a back and bottom cushion, said automobile seat cover comprising a back cover portion, said back cover portion having an inner surface conforming to said bench back cushion, two back cushion inserts formed on the outer surface of said back cover portion, said back cushion inserts having raised spaced parallel vertical ribs along the outer edges of a depressed central portion, back fabric insert covers overlying said back cushion inserts and securing said back cushion inserts to said back cover portion, a bottom cover portion, said bottom cover portion having an inner surface conforming to said bench bottom cushion, two bottom cushion inserts on the outer surface of said bottom cushion portion, said bottom cushion inserts having raised spaced parallel vertical ribs along the outer edges of a depressed central portion, bottom fabric insert covers overlying said bottom cushion inserts and securing said bottom cushion inserts to said bottom cover portion, each of said bottom cushion inserts being aligned with an associated back cushion insert to form with said back fabric insert covers and said bottom fabric insert covers two spaced parallel bucket seat additions secured to said back and bottom cover portions, the space between the adjacent vertical ribs of said bucket seat additions defining a middle seating area, and means for removably securing said back and bottom cover portions to said back and bottom cushions respectively.

2. The automobile seat cover of claim 1 wherein said back cushion inserts include a raised horizontal rib joining the top edges of said back cushion insert spaced parallel vertical ribs.

3. The automobile seat cover of claim 2 including a bottom central cushion insert, said bottom central cushion insert being placed on said bottom cover portion middle seating area, said bottom central cushion insert extending between the vertical ribs of said bottom cushion inserts defining said middle seating area, and a bottom fabric central cushion insert cover overlying said bottom central cushion insert and securing said bottom central cushion insert to said bottom cover portion.

References Cited in the file of this patent
UNITED STATES PATENTS

| 1,853,579 | Sallop | Apr. 12, 1932 |
| 1,946,825 | Wittcoff | Feb. 13, 1934 |
| 2,627,303 | Bard | Feb. 3, 1953 |
| 2,980,167 | Harris et al. | Apr. 18, 1961 |

FOREIGN PATENTS

| 596,787 | France | Aug. 17, 1925 |
| 864,301 | Great Britain | Mar. 29, 1961 |
| 1,032,167 | France | Mar. 23, 1953 |
| 1,080,422 | Germany | Apr. 21, 1960 |
| 1,090,112 | Germany | Sept. 29, 1960 |